US012770073B2

(12) United States Patent
Singh et al.

(10) Patent No.: US 12,770,073 B2
(45) Date of Patent: Oct. 20, 2026

(54) SYSTEM AND METHOD TO IDENTIFY JOBS TO BE DONE FOR ACHIEVING DESIRED BUSINESS OUTCOMES

(71) Applicants: Anupam Singh, Gibsonia, PA (US); Bhaskar Sen, Royersford, PA (US); Prashanth Bs, Bengaluru (IN); Razi Imam, New York, NY (US); Jenna Kerr, Pittsburgh, PA (US); Michael Stallsmith, Charlotte, NC (US)

(72) Inventors: Anupam Singh, Gibsonia, PA (US); Bhaskar Sen, Royersford, PA (US); Prashanth Bs, Bengaluru (IN); Razi Imam, New York, NY (US); Jenna Kerr, Pittsburgh, PA (US); Michael Stallsmith, Charlotte, NC (US)

(73) Assignee: Anupam Singh, Gibsonia, PA (US)

( * ) Notice: Subject to any disclaimer, the term of this patent is extended or adjusted under 35 U.S.C. 154(b) by 0 days.

(21) Appl. No.: 18/654,473

(22) Filed: May 3, 2024

(65) Prior Publication Data

US 2024/0370789 A1 Nov. 7, 2024

Related U.S. Application Data

(60) Provisional application No. 63/499,496, filed on May 2, 2023.

(51) Int. Cl.
*G06Q 10/0631* (2023.01)

(52) U.S. Cl.
CPC ................................ *G06Q 10/0631* (2013.01)

(58) Field of Classification Search
None
See application file for complete search history.

(56) References Cited

U.S. PATENT DOCUMENTS 8,214,238 B1 7/2012 Fairfield et al.
8,265,981 B2 9/2012 Ficery et al.
(Continued)

FOREIGN PATENT DOCUMENTS

CN 113689140 A * 11/2021 ........... G06Q 10/087

OTHER PUBLICATIONS

H. Takeuchi, R. Iga, K. Katayama, H. Mitsuyama, R. Motegi and A. Uematsu, "Identification of Business Goals of AI Service System based on GQM+Strategies," 2021 10th International Congress on Advanced Applied Informatics (IIAI-AAI), Niigata, Japan, 2021, pp. 768-771 (Year: 2021).*

*Primary Examiner* — Jerry O'Connor
*Assistant Examiner* — Philip N Warner
(74) *Attorney, Agent, or Firm* — S.J. Intellectual Property LTD

(57) ABSTRACT

The invention is a system and method to identify and augment Jobs To Be Done (JTBD) comprising an input module (100) configured to receive an input data in a desired format, said input module further configured to prepare the input data for further processing; a feature extraction module (101) configured to automatically perform an extraction operation on the input data processed in step a) to extract a plurality of entities related to the approach of JTBD; a feature processing module (102) configured to identify patterns and relationships in the input data and grouping them for actionability; an opportunity prioritization/prediction module (103) configured to assign a salience value to each of the plurality of entities; and a JTBD formulation module (105) configured to process the extracted entities, the groupings and the patterns relationships among the entities, identify data with multiple entities, and compile them into a list of JTBD.

11 Claims, 13 Drawing Sheets

(56) References Cited

U.S. PATENT DOCUMENTS 8,417,715 B1 * 4/2013 Bruckhaus ............. G06Q 10/04 705/26.1
8,494,894 B2 * 7/2013 Jaster .................... G06F 16/367 705/7.29
11,232,383 B1 * 1/2022 Burns, Sr. .......... G06Q 10/0637
11,948,129 B2 4/2024 Gordon et al.
2007/0162316 A1 * 7/2007 Kratschmer ..... G06Q 10/06312 705/7.22
2008/0167930 A1 * 7/2008 Cao .................. G06Q 10/06311 705/7.14
2008/0167936 A1 * 7/2008 Kapoor .............. G06Q 30/0201 705/7.29
2008/0313596 A1 * 12/2008 Kreamer ................... G06F 8/20 717/101
2009/0125353 A1 * 5/2009 Bullock ......... G06Q 10/063118 705/7.14
2010/0082387 A1 * 4/2010 Cao ........................ G06Q 10/06 705/7.38
2013/0290072 A1 * 10/2013 Ren .................... G06Q 10/0637 705/7.36
2015/0100391 A1 * 4/2015 Dasgupta ......... G06Q 10/06393 705/7.39
2019/0320067 A1 * 10/2019 Pearce ................. G06Q 30/015
2020/0043026 A1 2/2020 Cruz-Rivera
2020/0111044 A1 * 4/2020 New, Jr. ................... G06N 3/09
2020/0159525 A1 * 5/2020 Bhalla ....................... G06F 8/71
2020/0202268 A1 * 6/2020 Retna ..................... G06N 20/00
2021/0019357 A1 * 1/2021 Bennett ................... G10L 15/26
2021/0192412 A1 * 6/2021 Krishnaswamy ............................ G06Q 10/06316
2021/0272045 A1 * 9/2021 Reshef ................... G06N 20/00
2021/0319372 A1 * 10/2021 Watt ...................... G06F 16/212
2021/0374778 A1 * 12/2021 Schlick .............. G06Q 30/0201
2022/0114532 A1 * 4/2022 Virnoche ....... G06Q 10/063112
2022/0329524 A1 * 10/2022 Sinha .................. H04L 41/0896
2022/0374814 A1 * 11/2022 Buchbinder ... G06Q 10/063112
2023/0065120 A1 * 3/2023 Hanby, IV ....... G06Q 10/06311
2023/0135179 A1 * 5/2023 Mielke ................... G06N 5/022 704/232
2023/0297886 A1 * 9/2023 Glaser .................... G06N 20/00 706/12
2023/0306324 A1 * 9/2023 Terner .............. G06Q 10/06311
2024/0069963 A1 * 2/2024 Gharaybeh ........... G06F 9/4881
2024/0311664 A1 * 9/2024 Stanley ............. G06Q 10/0637

* cited by examiner

| Need / Situation | Snacking at home | Snacking at work |
|---|---|---|
| keep me energized, focused, productive, alert, awake. | Medium | High |
| Pre portioned snacks to avoid overeating | Low | High |

| 113 Prioritized Needs in Snack | At home | | | At work | | |
|---|---|---|---|---|---|---|
| | Importance | Satisfaction | Opportunity | Importance | Satisfaction | Opportunity |
| keep me energized, focused, productive, alert, awake. | 7 | 5 | 7*(10-5) = 35 | 10 | 5 | 10*(10-5) = 50 |
| pre-portioned snacks to prevent overeating | 5 | 9 | 5*(10-9) = 5 | 10 | 2 | 10*(10-2) = 80 |

Figure 14

SYSTEM AND METHOD TO IDENTIFY JOBS TO BE DONE FOR ACHIEVING DESIRED BUSINESS OUTCOMES

CROSS-REFERENCES

This application claims benefit to provisional application No. 63/499,496 filed on May 3, 2023. The text of the provisional specification is incorporated herewith by way of reference.

FIELD OF THE INVENTION

The present invention pertains to a system and method that enables identification of the Jobs To Be Done (JTBD) for achieving desired business outcomes, using machine learning and artificial intelligence technology. In particular, the present invention provides a mechanism for identifying, evaluating and prioritizing JTBD that impact business strategy, marketing, innovation, development and mergers and acquisitions initiatives which allows businesses to better tailor the products and services to customer needs, differentiate and position the products and services, grow the market share and to maintain a competitive edge in the marketplace.

BACKGROUND OF THE INVENTION

The concept of Jobs To Be Done (JTBD) is a business framework that focuses on understanding the needs and goals of customers by identifying the jobs they are trying to accomplish. The concept of JTBD emphasizes the importance of understanding the context and circumstances surrounding customer's decision-making processes.

In addition, customer decisions are driven by the desire to make progress in their life and to solve specific problems. By understanding the jobs that customers are trying to get done, companies can create better products and services that meet their customer's needs and expectations.

The framework of JTBD suggests that understanding customer needs requires looking beyond basic demographic information and product preferences. Instead, it requires understanding the specific jobs that customers are trying to do, the circumstances that surround those jobs, and the outcomes that they hope to achieve. By focusing on the jobs that customers are trying to accomplish, companies can develop more targeted marketing messages, create more effective product features, and differentiate themselves from competitors.

In recent years, the concept of JTBD has gained traction as a powerful framework for understanding customer needs and developing solutions that meet those needs. This approach involves identifying the specific jobs that customers are trying to accomplish and designing products and services that help them do so more efficiently and effectively. Additionally, other methodologies have been developed which impact business strategy, marketing, innovation and development.

There are many frameworks and methodologies to uncover the JTBD. What they all have in common is that it is NOT easy to execute and implement them in an organization irrespective of their application. Businesses and organizations that want to use these frameworks often turn to consultants and businesses specializing in JTBD. This can often be an expensive and resource intensive endeavor.

In this context, there is an increasing interest in the use of automation to help businesses identify the JTBD for their customers or even for their own business functions. Automation takes many forms, from robotic process automation to machine learning algorithms that provide personalized recommendations.

U.S. Pat. No. 8,265,981B2 discloses a method and system for identifying a business organization that needs transformation. In one implementation, the method and system may include providing information, such as financial, marketing, and internal information, related to a business organization; determining from the information whether the business organization has had a performance trigger; adding the business organization to a list of transformation candidates if the determination identifies the business organization as having had a performance trigger; and displaying on a display device whether the business organization is a candidate for transformation. U.S. Pat. No. 8,214,238B1 discloses a high performance capability assessment model helps a consumer goods and services business meet the challenges of the global marketplace. As a result, the consumer goods and services business can achieve the clarity, consistency, and well-defined execution of core processes that reduces inefficiencies and waste that result from unnecessary process complexity and exceptions. In addition, the high performance capability assessment model helps the consumer goods and services business to identify specific areas in which improvements may be made and to understand how to make the improvements, and establish levels of capability along the way to reaching an ultimate capability goal.

While there has been significant progress in the development of software tools to predict and automate the JTBD, there are still several drawbacks in the currently available software that include but are not limited to lack of accuracy, limited scope, high complexity, and high implementation cost. Overall, while existing software tools are a step in the right direction towards predicting and automating JTBD, there are still several drawbacks that need to be addressed to improve the accuracy, scope, complexity, and cost-effectiveness of these solutions. Further, there are scenarios where the currently available systems are not able to identify all the aspects which should be considered in defining the JTBD. Reasons include the language nuances and complexity involved in analysing the data. More specifically, the currently available systems fail to extract all the available relevant information to create a comprehensive list and definition of JTBD. Additionally, there is no provision to evaluate and prioritize the JTBD.

In view of the above, there is a recognized need for a multi-step system and method that is simple to implement, yet highly effective in producing fast and accurate results. Such a system and method which is able to identify JTBD, and also able to identify any missing entities that are necessary for understanding customer needs and goals.

OBJECT AND SUMMARY OF THE INVENTION

In view of the foregoing disadvantages inherent in the known types of recommendation systems or business frameworks present in the prior art, the present invention provides a system and method to identify JTBD, wherein the system and method works via Large Language Models (LLMs) such as GPT4, Claude2, Mistral etc., Natural Language Processing (NLP) tools and libraries, analytics and data science tools, algorithms and custom code augmented and guided by Subject Matter Experts (SMES) to process and analyse the data to define the JTBD.

According to an embodiment, the present invention comprises a plurality of modules that work together to achieve the desired outcome i.e. an input module (100) that receives input data in any format, including but not limited to text, voice, or video, and prepares the input data for further processing, a feature extraction module (101) that automatically conducts an extraction operation on the processed input data to extract a plurality of entities that are related to the approach of JTBD, using machine language (ML) and artificial intelligence (AI) techniques. The entities extracted herein include needs (including unmet needs), wants, desires, need states, current situation or context, compensating behaviours or workarounds or hacks, solutions, hires including alternate hires, fires or deselects (products/services rejected), activities, pains, barriers, tensions, motivation, desired outcome, social component, and emotional component (feelings, emotions). A feature processing module (102) that identifies patterns and relationships in the data and groups them in meaningful ways for actionability, an opportunity prioritization/prediction module (103) that assigns a salience value to each entity, a visualization/user interface (UI) module (104) that displays the entities, their groupings and their patterns/relationships, a JTBD formulation module (105) that uses all this information to identify data with multiple entities, and compiles them into a list of JTBD. An additional JTBD augmentation module (106) enhances the JTBD list by predicting additional JTBD based on data elements that may only have a few of the entities OR prior knowledge or additional research. Overall, the present invention enables streamlined identification of JTBD that enhances customer satisfaction and business success by utilizing the power of machine learning and artificial intelligence guided by human expertise.

According to another embodiment, the present invention also provides a method to identify JTBD that comprise steps of:

a) receiving an input data in an input module (100) in a format, including but not limited to text, voice, or video, and processing the input data;

b) extracting from the processed input data a plurality of entities related to the approach of JTBD, in a feature extraction module (101) using machine language (ML) and artificial intelligence (AI) techniques;

c) identifying patterns and relationships in the extracted plurality of entities and grouping them in desired manner for actionability in a feature processing module (102);

d) assigning a salience value to each of the plurality of extracted entity in an opportunity prioritization/prediction module;

e) displaying the plurality of entities, their groupings and their patterns/relationships, in a visualization/user interface (UI) module;

f) identifying data with multiple entities, and compiling them into a list of JTBD in a JTBD formulation module; and g) optionally enhancing the JTBD list using JTBD augmentation module by predicting additional JTBD based on data elements that may only have a few of the entities OR prior knowledge or additional research.

Further in an alternate arrangement, extracting of entities is performed manually or automatically from the data received from step a) and a domain expert defined, directed or assisted list-based query is generated in the manual approach and a semantic similarity-based extraction is conducted in the automated approach. An opportunity prioritization/prediction assigns a salience value to each entity, a JTBD formulation module uses all this information to identify data with multiple entities, and compiles them into a list of JTBD. Optionally, this list can be modified and aligned with an a-priori list of JTBD known to the SME. Manual and automated augmentation is performed to identify missing entities and generate comprehensive lists of JTBD.

Overall, the present invention enables streamlined identification of JTBD that enhances customer satisfaction and business success by utilizing the power of machine learning and artificial intelligence guided by human expertise.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a system and method to identify JTBD for achieving desired business outcomes.

Another object is to provide a system and method that produces a compressive list of JTBD through Large Language Models (LLMs), Natural Language Processing (NLP) tools and libraries, analytics and data science tools, algorithms and custom codes to analyse various source including user feedback, project documentation, and historical data, to identify patterns and trends that can indicate hidden requirements.

Yet another object is to provide a system and method that helps the organizations to understand why customers buy and use products and services.

Yet another object is to provide a system and method that is able to add the missing entities to complete the definition of JTBD and involves a plurality of approaches to find out the missing entities.

Still another object is to provide a system and method that formulate the JTBD and evaluate, prioritize the JTBD which ultimately helps in the businesses to identify new opportunities for growth and innovation by focusing on the underlying needs and motivations of customers, rather than simply replicating existing products and features.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 14 shows a matrix of multiple entities identified by the system for identifying JTBD for achieving desired business outcomes in an exemplary embodiment.

DETAILED DESCRIPTION OF THE INVENTION

The present invention is directed towards a system and method for accurately identifying JTBD for achieving desired business outcomes that offers significant advantages to businesses in terms of efficiency, customer experience, resource allocation, data insights, scalability, reduced errors, and cost savings.

All embodiments below assume the input data is posts on social media or online/web-based platforms such X/Twitter, Facebook, Instagram, Reddit, Tik-Tok, Sina Weibo, forums, community groups, product review platforms or user generated content on brand owned websites or channels such as customer care emails and/or platforms (such as Quid, Sprinklr, BrandWatch) that aggregate data from multiple of these sources etc. or transcribed from user interviews, focus groups, surveys, diaries, journals etc. and have been legally and legitimately acquired for analysis and processing. Further, it may include data originally in other formats (such as video, audio) and converted to text.

For sake of uniformity, few terms are being used interchangeably. Particularly, entities, features and variables are being used interchangeably, and being inferred in related manner.

According to an embodiment, the present invention comprises a system to identify and extract a Job To Be Done, comprising a plurality of modules that work together to achieve the desired outcome i.e. an input module (100) that receives input data in any format, including but not limited to text, voice, or video, and prepares the input data for further processing, a feature extraction module (101) that automatically conducts an extraction operation on the processed input data to extract a plurality of entities that are relevant to the aspects which are related to the approach of JTBD, using machine language and artificial intelligence techniques to identify entities that are relevant to defining JTBD. The entities used herein include current situation, motivation, outcome, but can also include needs (including unmet needs), wants, desires, need states, compensating behaviours or workarounds or hacks, solutions, (alternate) hires, deselects (products/services rejected very early on in the purchase cycle), activities, pains, barriers, tensions, social component, and emotional component (feelings, emotions) to define the JTBD, a feature processing module (102) that embeds the extracted entities by applying algorithms of dimensionality reduction and density-based clustering, which helps to identify patterns and relationships in the data, an opportunity prioritization/prediction module (103) that assigns a salience value to each entity in the cluster of entities and uses this information to identify data with multiple entities, which are then compiled into a starter list of JTBD. Overall, the present invention enables streamlined identification of JTBD that enhances customer satisfaction and profitability by utilizing the algorithms of machine learning and artificial intelligence.

Figure 1:
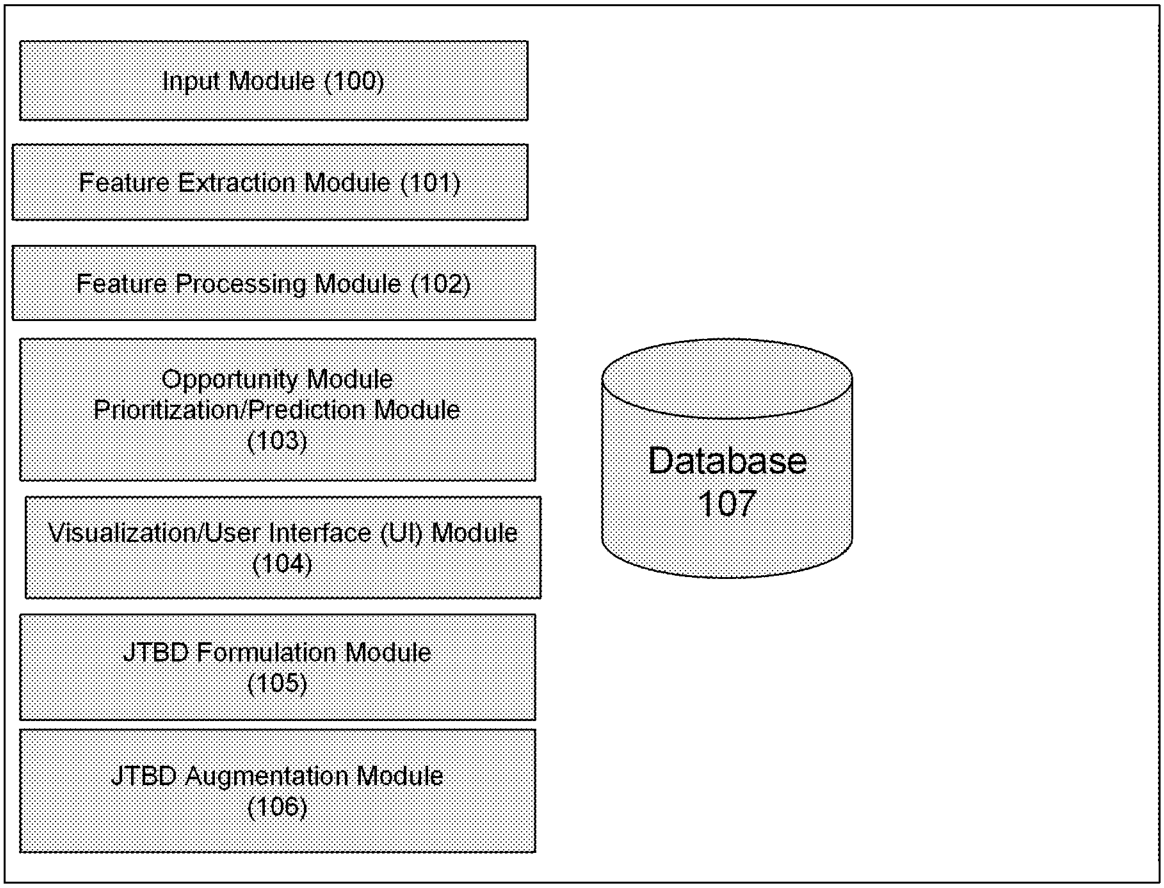
FIG. 1 shows a block diagram of the system for identifying JTBD for achieving desired business outcomes.

According to an embodiment depicted in FIG. 1, the present invention comprises a plurality of modules that work together to achieve the desired outcome i.e. an input module (100) that receives input data in any format, including but not limited to text, voice, or video, and prepares the input data for further processing, a feature extraction module (101) that automatically conducts an extraction operation on the processed input data to extract a plurality of entities that are related to the approach of JTBD, using machine language (ML) and artificial intelligence (AI) techniques. The entities extracted herein include needs (including unmet needs), wants, desires, need states, current situation or context, compensating behaviours or workarounds or hacks, solutions, hires including alternate hires, fires or deselects (products/services rejected), activities, pains, barriers, tensions, motivation, desired outcome, social component, and emotional component (feelings, emotions). A feature processing module (102) that identifies patterns and relationships in the data and groups them in meaningful ways for actionability, an opportunity prioritization/prediction module (103) that assigns a salience value to each entity, a visualization/user interface (UI) module (104) that displays the entities, their groupings and their patterns/relationships, a JTBD formulation module (105) that uses all this information to identify data with multiple entities, and compiles them into a list of JTBD. An additional JTBD augmentation module (106) enhances the JTBD list by predicting additional JTBD based on data elements that may only have a few of the entities OR prior knowledge or additional research. Overall, the present invention enables streamlined identification of JTBD that enhance customer satisfaction and business success by utilizing the power of machine learning and artificial intelligence guided by human expertise.

Figure 2:
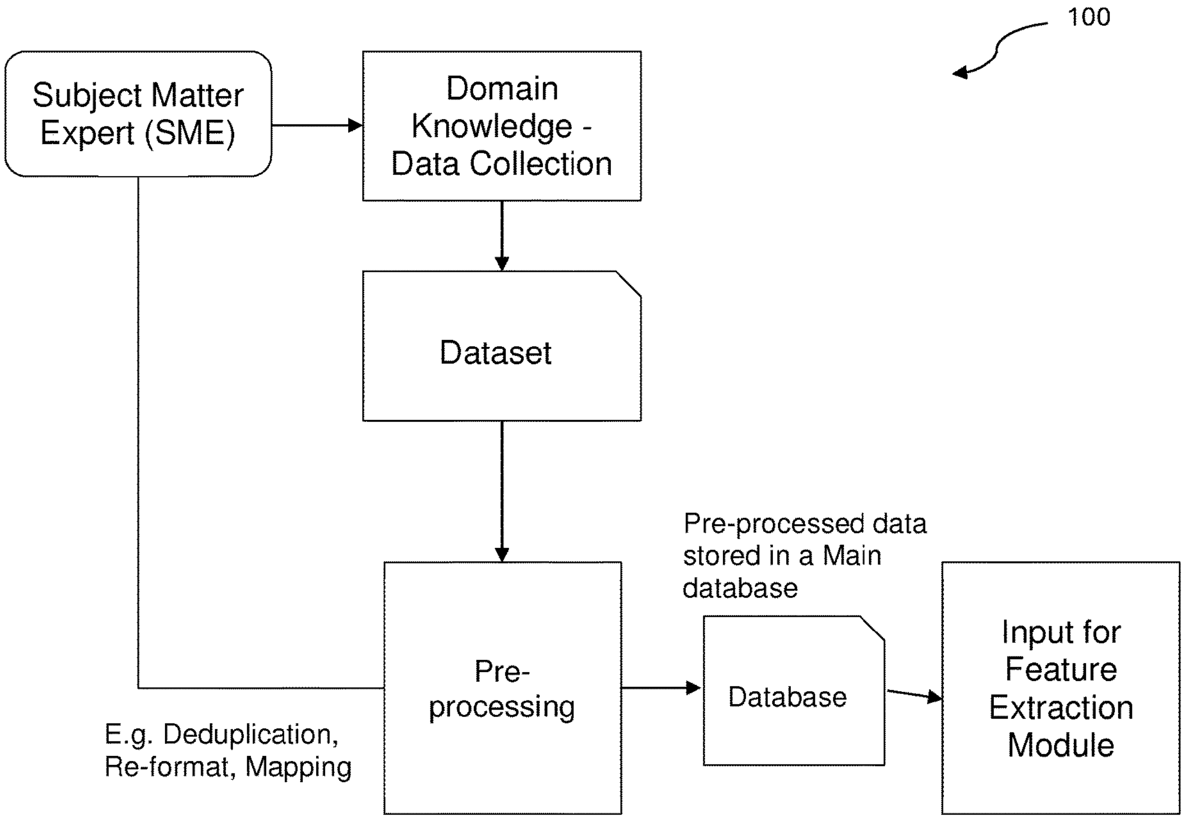
FIG. 2 shows flow chart of the functionality of input module (100) and the method adopted for obtaining data and selecting entities for achieving desired business outcomes.
Figure 3:
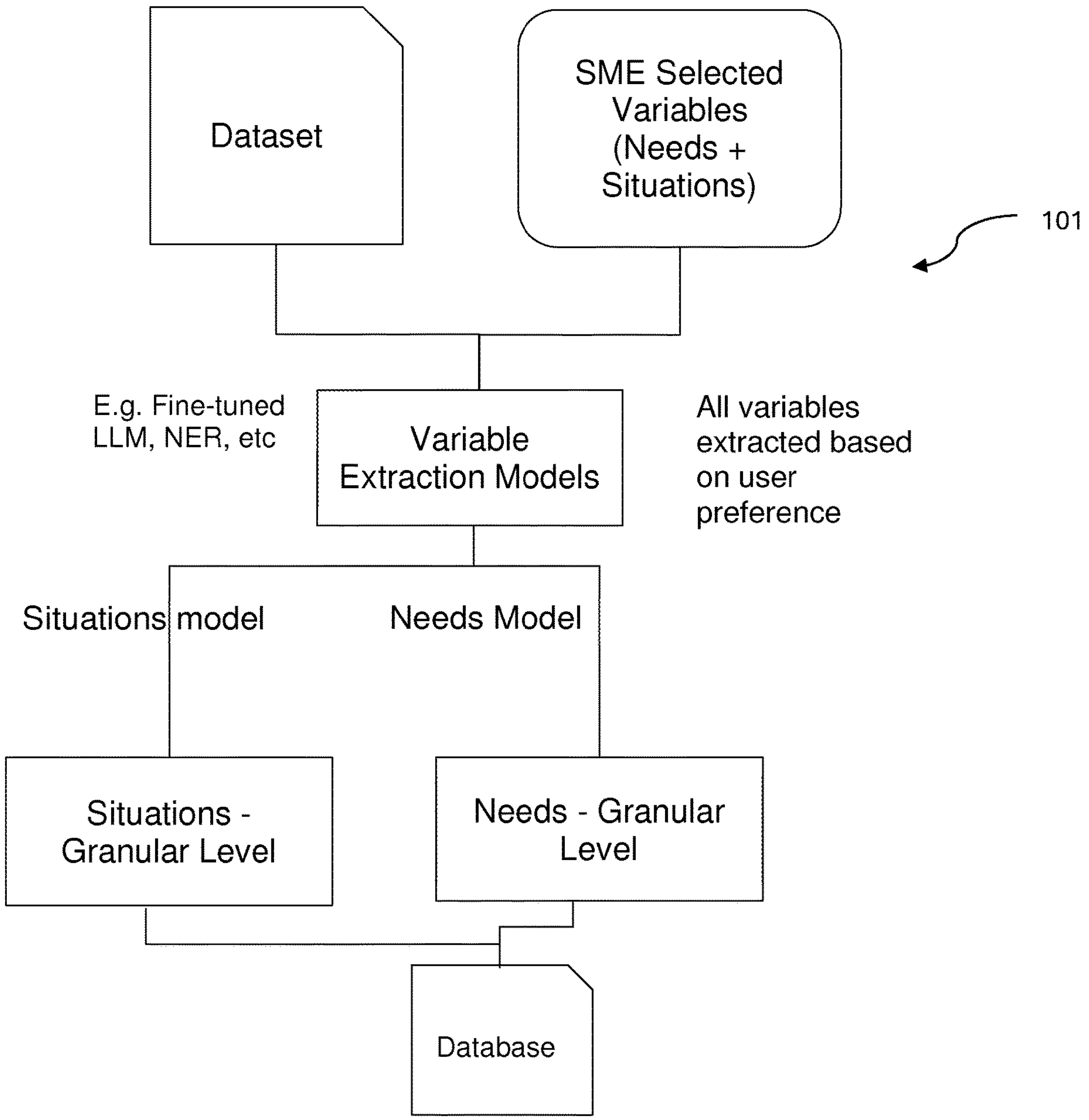
FIG. 3 shows flow chart of the functionality of feature extraction module (101) and the method adopted for extracting desired entities based on SME selected entities for achieving desired business outcomes.
Figure 4:
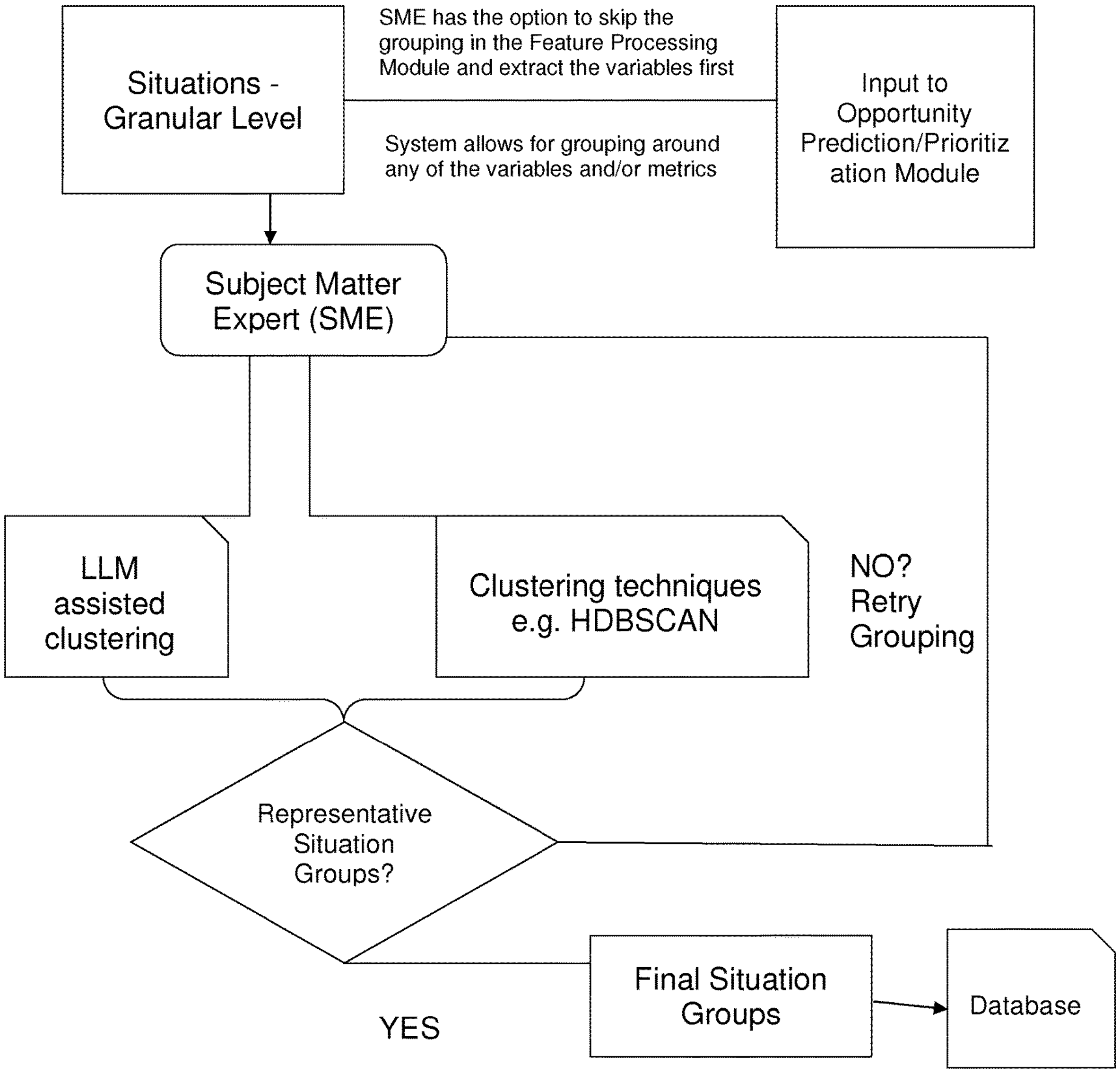
FIG. 4 shows flow chart of the functionality of feature processing module (102) and the method adopted for processing entities and clustering through LLM for achieving desired business outcomes.
Figure 5:
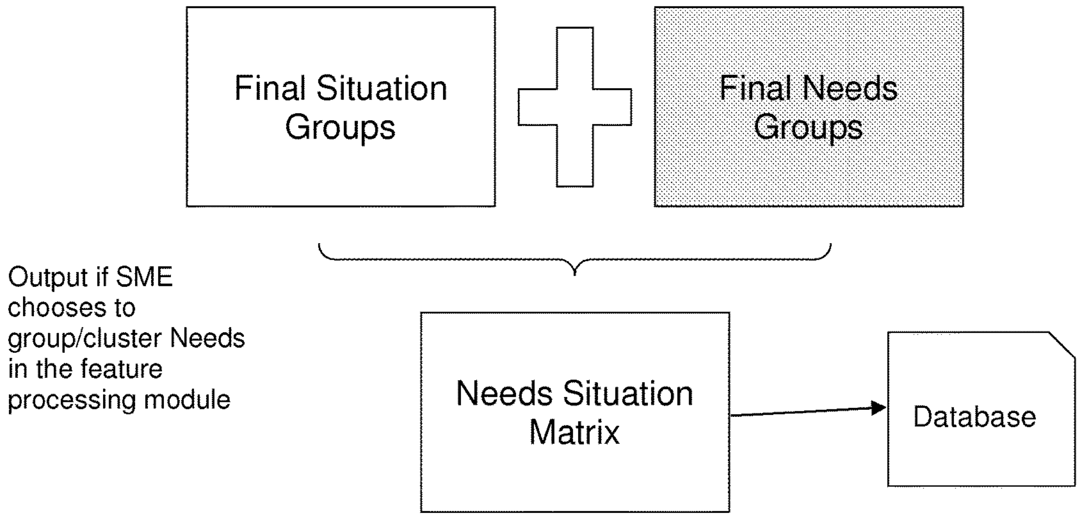
FIG. 5 shows needs situation matrix output in different selection of modules.
Figure 5:
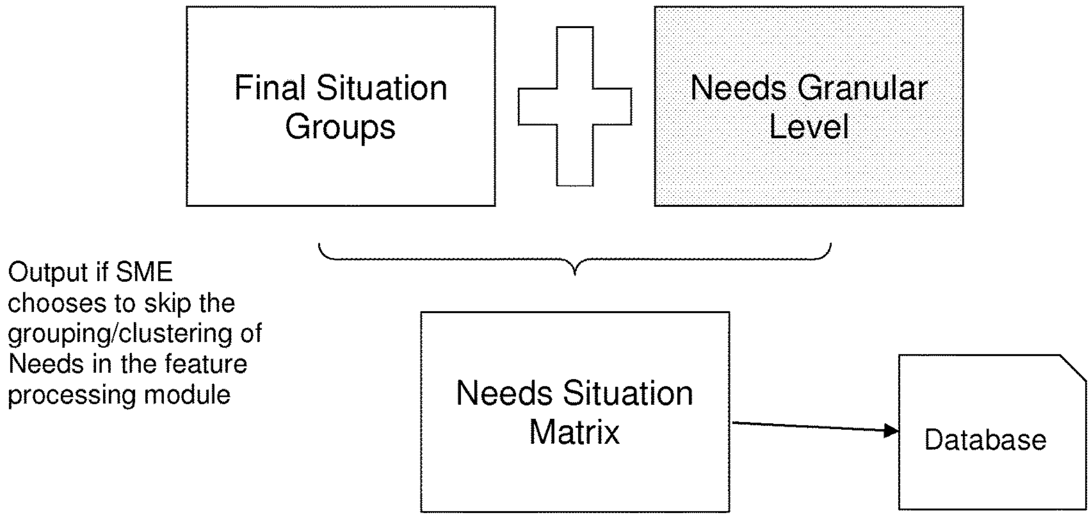
Figure 6:
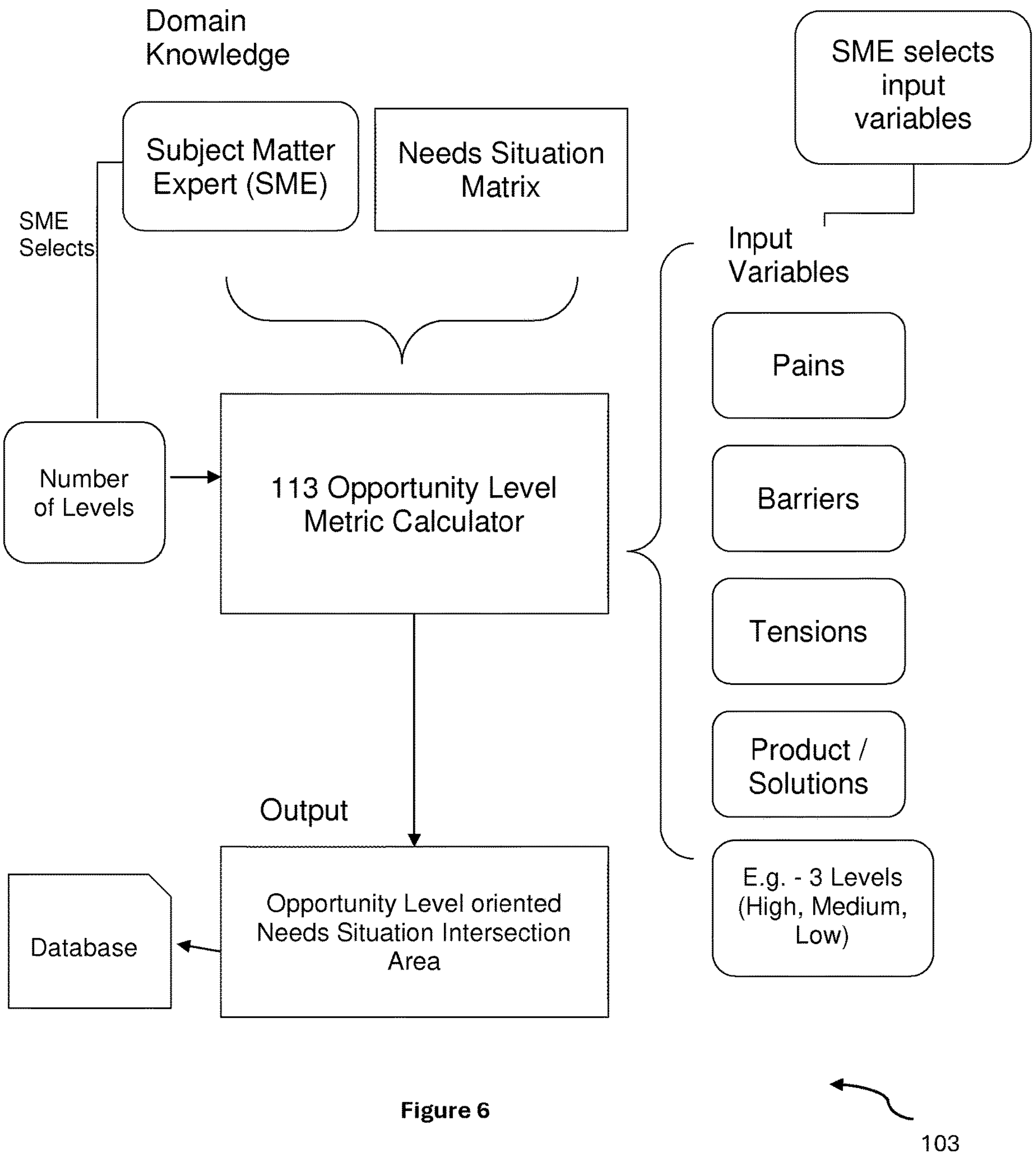
FIG. 6 shows flow chart of the input flow from feature extraction module and functionality of opportunity prioritization/prediction module (103) and the method adopted for calculating opportunity metrics.
Figure 7:
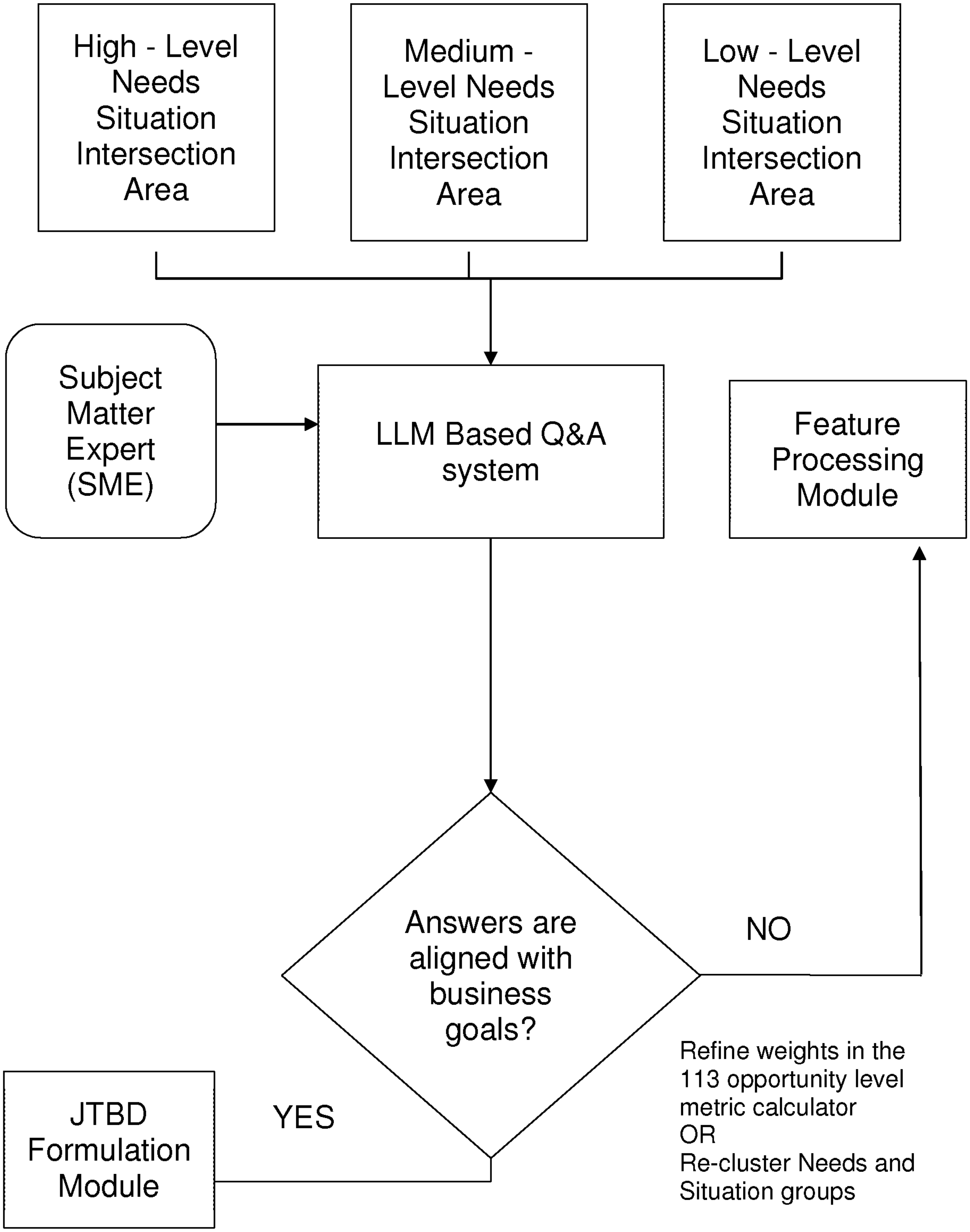
FIG. 7 shows flow chart of the functionality of opportunity prioritization/prediction module (103) and the method adopted for calculating opportunity metrics based on LLM Based Q&A.
Figure 8:
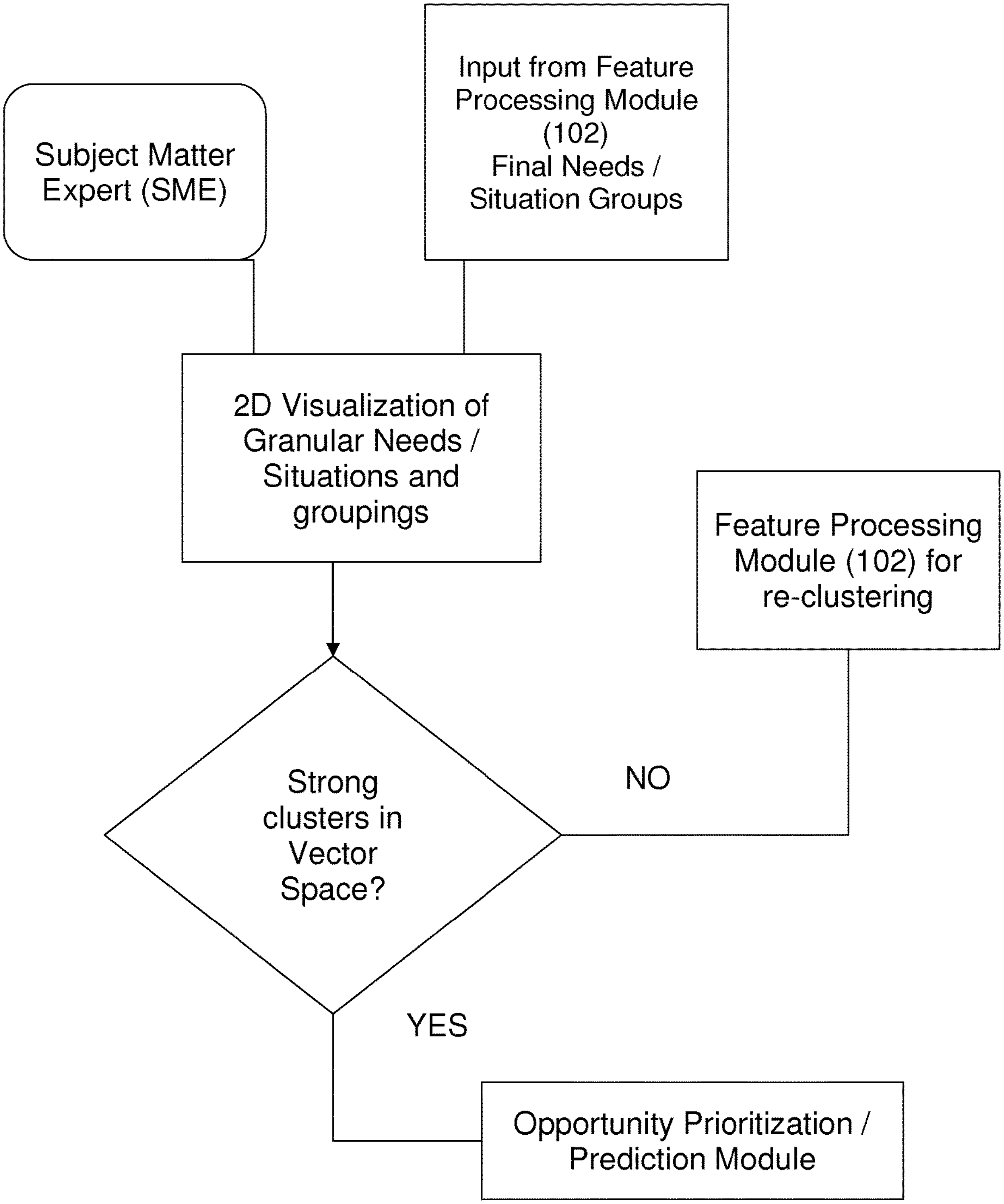
FIG. 8 shows flow chart of the input flow from feature processing module and functionality of opportunity prioritization/prediction module (103) and the method adopted for 2D visualization and groupings.
Figure 9:
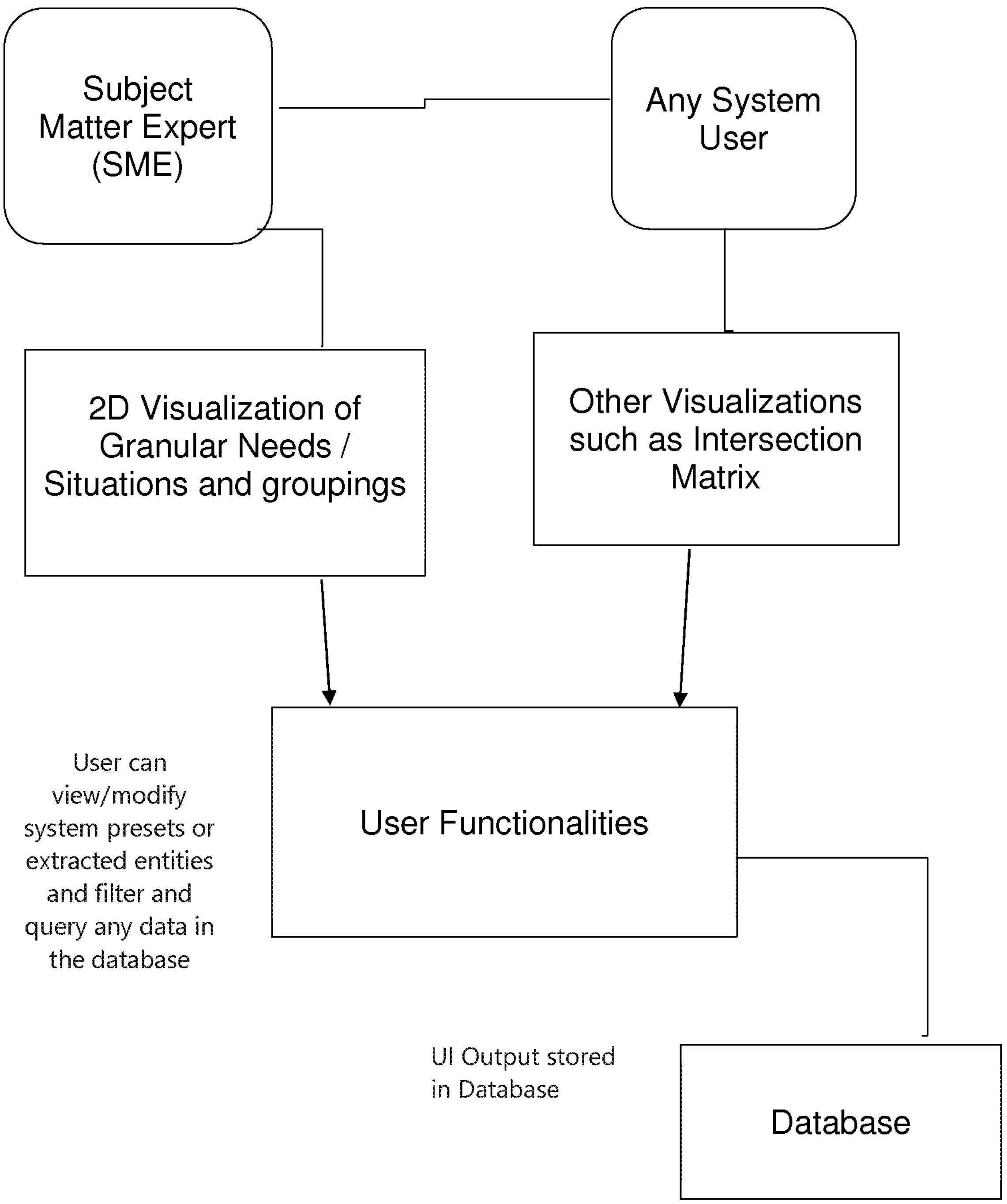
FIG. 9 shows flow chart of the functionality of visualization/user interface (UI) module (104) and the method adopted for allowing user to modify and store data including but not limited to entities, weights, metrics, rules etc.
Figure 10:
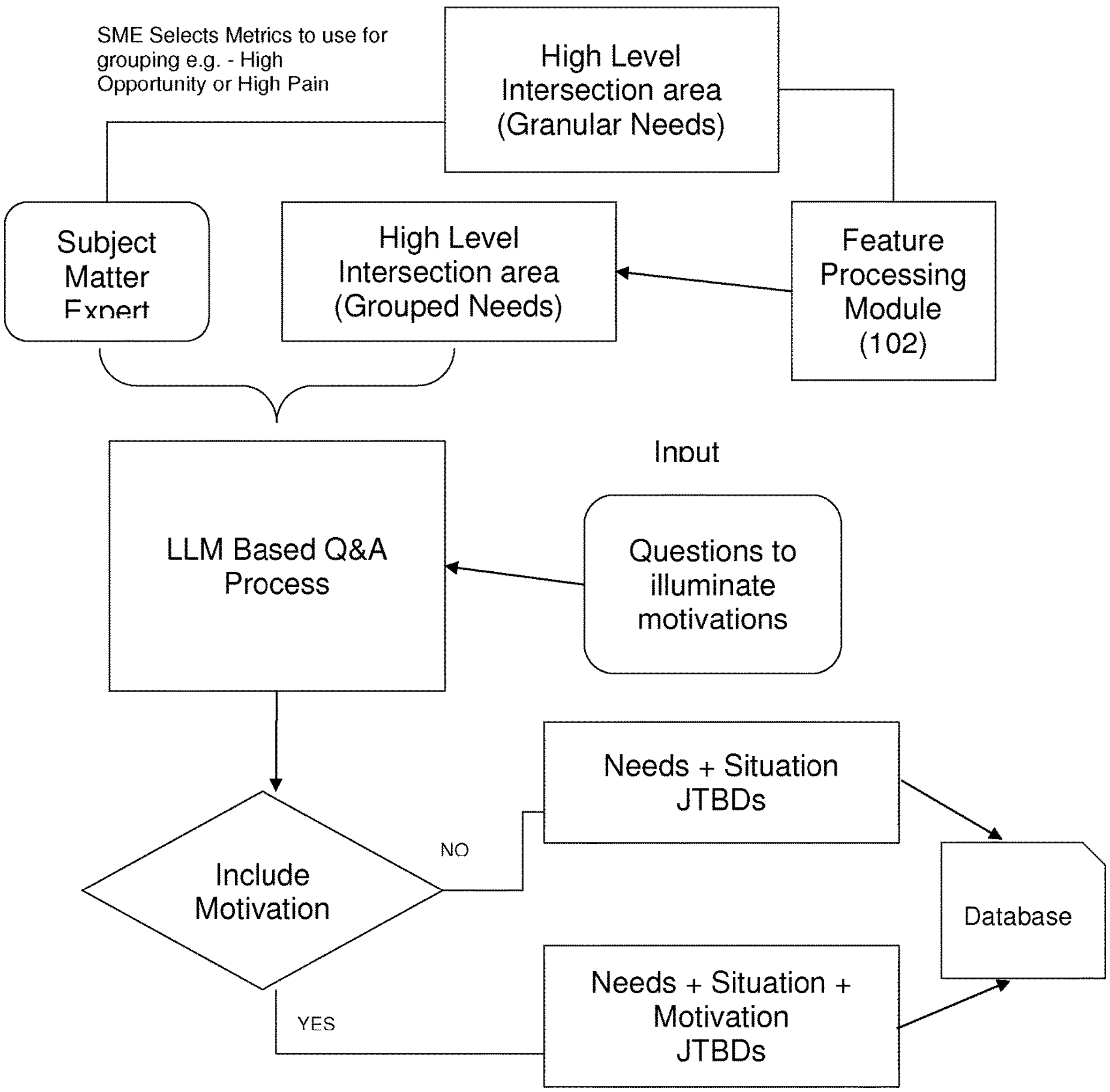
FIG. 10 shows flow chart of the functionality of JTBD creation module (105) and the method adopted for obtaining data using feature processing module (102) and selecting entities for achieving desired business outcomes.
Figure 11:
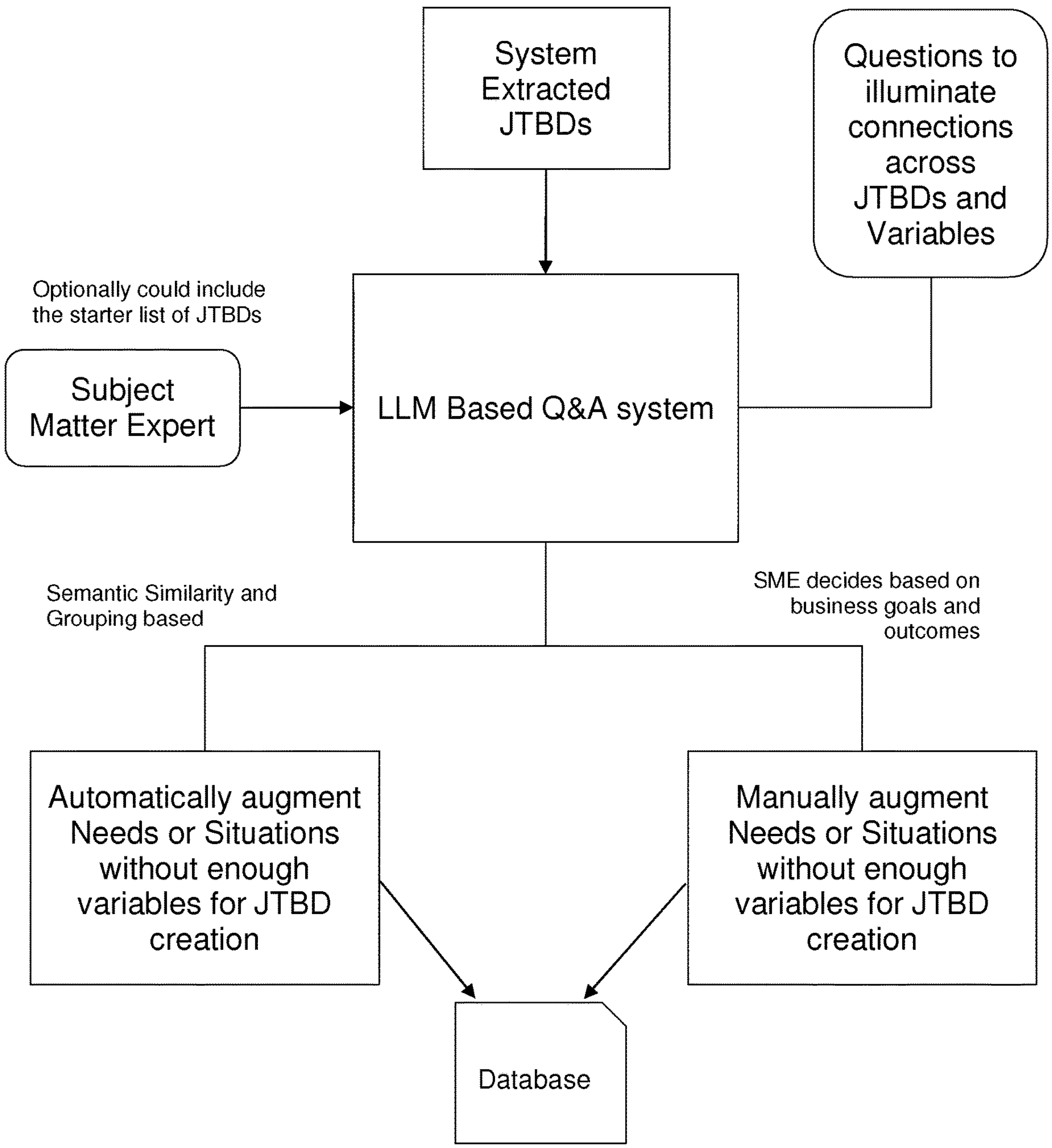
FIG. 11 shows flow chart of the functionality of JTBD augmentation module (106) and the method adopted for obtaining data and selecting entities for achieving desired business outcomes if user skips feature processing module (102).

According to an embodiment, the present invention also provides a method to identify and extract JTBD that comprise steps of:

a) receiving an input data in an input module (100) in a format, including but not limited to text, voice, or video, and processing the input data, as referred to in FIG. 2;

b) extracting from the processed input data a plurality of entities related to the approach of JTBD, in a feature extraction module (101) using machine language (ML) and artificial intelligence (AI) techniques, as referred to in FIG. 3;

c) identifying patterns and relationships in the extracted plurality of entities and grouping them in desired manner for actionability in a feature processing module (102) as referred to in FIG. 4;

d) assigning a salience value to each of the plurality of extracted entity in an opportunity prioritization/prediction module (103), as depicted in FIG. 6;

e) displaying the plurality of entities, their groupings and their patterns/relationships, in a visualization/user interface (UI) module (104) as depicted in FIG. 8;

f) identifying data with multiple entities, and compiling them into a list of JTBD in a JTBD formulation module (105), as depicted in FIG. 7; and g) optionally enhancing the JTBD list using JTBD augmentation module (106) by predicting additional JTBD based on data elements that may only have a few of the entities OR prior knowledge or additional research, as depicted in FIG. 11.

The entities extracted in step b) include needs (including unmet needs), wants, desires, need states, current situation or context, compensating behaviours or workarounds or hacks, solutions, hires including alternate hires, fires or deselects (products/services rejected), activities, pains, barriers, tensions, motivation, desired outcome, social component, and emotional component (feelings, emotions). Further in an alternate arrangement, extracting of entities is performed manually or automatically from the data received from step a) and a domain expert defined, directed or assisted list-based query is generated in the manual approach and a semantic similarity-based extraction is conducted in the automated approach A salience value is assigned to each entity in a group and it is then checked whether the salience value is aligned with domain expert knowledge and in case the value is not aligned then an option is provided to manually override the salience value to the user for assigning the paramount entities, and in case the value is aligned, data is identified with multiple entities into a starter of lists of JTBD. Manual and automated augmentation is performed to identify missing entities and generating comprehensive lists of JTBD.

According to another embodiment, the present invention also provides method to identify JTBD that comprise steps of a) receiving an input data (e.g., social media posts) and performing data cleaning and preprocessing operations to obtain actionable data for further processing, b) extracting situations manually by generating a domain expert-defined list based on query, or automatically by conducting a semantic similarity-based extraction from the data received in step (a), c) clustering the extracted situations into groups, d) extracting needs (pains, tensions, emotions, barriers) from the input data within the context of the extracted situations, e) initially extracting all granular needs, then clustering or grouping the needs using LLM-assisted clustering into high-level groups, and allowing SMEs to re-cluster into more granular groups based on prior knowledge, f) Optional—Skip step (e) and keep the needs at a granular level to use the opportunity level metric (from step h) or other extracted entities as a basis for grouping. g) creating a needs and situations intersection matrix, h) allowing the user to extract entities (e.g., pain, barriers, hired/fired emotions) within each needs and situation intersection in the matrix, i) allowing the user to use multiple entities of interest, with a weighted equation mapping variable values into different levels and creating a heatmap of opportunity levels (high, medium, low) represented by colors, where high opportunity (e.g., red) indicates strong JTBD innovation potential, j) providing the user a choice of segmenting entities into different levels for classifying needs+situation intersections into a levels-based visualization of innovation opportunities, k) conducting an LLM-based Question and Answering process for diving deeper into potential JTBDs, refining variable weights, and refining needs and situation groups, l) in the JTBD Creation Module, allowing the user to select high-opportunity needs+situations intersections aligned with business goals, and generating JTBD statements using the need, situation, and optionally, motivation. m) performing manual and automated augmentation to identify missing entities and generating comprehensive lists of JTBDs.

The Input module in accordance with the system of this invention is programmed to receive the input data. It starts with setting up the data acquisition process which can vary based on the source(s) of data. This includes setting up specific topics, searches and/or queries in a data platform such as X/Twitter or Quid, using their APIs or web-services and/or additional steps such as downloading the data into files in a specific supported format such as comma-separated-value (CSV), Excel, Json etc.

It also pre-processes the input data to make the data suitable for further processing. The pre-processing includes but not be limited to filtering data to remove bot-generated content, advertising or promotional content, down-sampling data (useful when the volume is very large), selecting only user-generated data (sometimes known as “personal voice”), filtering out specific data elements such as URLs, removing duplicate data, concatenating pieces of each data element such as Title/Subject of the channel or thread and the body of the post and/or replies/comments on the body of the post etc. For sources such as surveys, optionally additional processing is performed such as combining multiple answers including multiple choice and rating answers with related open-ended (or free text) answers for each respondent. In all these transformations, one must carry through an identifier (and related identifiers if multiple data elements were combined/concatenated etc.) that will uniquely represent each post and can be used to trace any processed post back to its original data elements.

The Feature extraction module performs a manual or automated entity extraction operation that extracts the most important aspects of defining the JTBD including but not limited to current situation (context), needs (including unmet needs), wants, desires, need states, compensating behaviours or workarounds or hacks, solutions, (alternate) hires, deselects (products/services rejected very early on in the purchase cycle), activities, pains, barriers, tensions, motivation, desired outcome, social component, and emotional component (feelings, emotions).

In an embodiment of the present invention the proposed system allows multiple techniques to extract the entities, included but not limited to LLM based techniques, using a few-shot trained prompt and traditional classifier based techniques, such as a multi-chain classifier trained on an existing list of the entity from the prior knowledge. An exemplary embodiment is to extract the situations or context using a data extraction model using an LLM. The LLM is fine-tuned using few-shot to extract the situations from each input data. Each input data element may have one or more situations. The module will extract ALL the situations from each post and store them for future processing. Further, the Feature extraction module envisions a starter list of situations (which can be domain or application specific) derived from prior usage of this system itself or a prior knowledge and added manually (with the associated underlying "post"). The system further learns and adds more members to this list through the extraction process described below.

The system allows guiding the clustering process based on prior knowledge from Domain Experts or Subject Matter Experts (SMEs), as well as existing groups or frameworks. For instance, an SME could group the Situations into Social, Emotional, and Functional categories. In such cases, the system enables the user to provide examples for each desired group, and then employs techniques like Few-Shot Learning to classify the situations accordingly.

Additionally, the system lets users modify the system-generated clustering by moving individual situations or groups of situations across clusters, combining clusters, splitting clusters, or a combination of these actions.

SME-guided clustering can take various forms. The system is configurable to use multiple algorithms for clustering-Two main categories are LLM-assisted and traditional methods. LLM-assisted include Few-shot and Zero-Shot techniques, as well as fine-tuned LLMs. The traditional algorithms include semantic similarity based clustering such as K-Means or density based such as HDBSCAN. The system supports configuring the desired clustering algorithm with appropriate metrics, such as distance from the cluster centroid or a maximum number of situations per cluster.

In one embodiment, the system solicits potential clusters from the SME, takes them as input, and then groups all the Situations around those clusters. This iterative system-based and SME-guided process continues until the SME is satisfied with the clustering or the system meets the prescribed criteria.

The Few-Shot technique involves providing a small number of examples for a group (e.g., Social), enabling the model to learn the group's semantics and classify the Situations accordingly.

The Opportunity Prioritization/Prediction Module gives the user the ability to use other entities such as Pain, barriers and hired or fired emotions to identify the opportunities of highest interest. In one embodiment, system uses a Situation vs. Needs matrix and computes a metric using other entities such as pains, hires to identify opportunity levels. In one such embodiment, system creates a heatmap of 3 levels (High, Medium and Low represented by 3 different colors such as Green, Yellow and Red). If a Needs+Situation intersection is highlighted as Green, there is a very high probability of a strong JTBD opportunity to innovate.

System allows the use of multiple entities. Typically, these exist in the intersection between situations/contexts and need states. JTBD frameworks use entities such as what is being Hired or Fired, and the associated pains, barriers. Also, core jobs are typically Functional but related jobs are social and/or emotional. These entities are now viewed as variables to compute a metric. Using the variables, we propose a weighted equation which maps the numerical value of each of the variables into n levels based on opportunity to innovate.

Each variable has a normalized metric (1-10). This score encompasses the number of times a particular variable is present in the intersection, the confidence scores, and a weight. These weights are derived from historical data, domain expertise, and prior knowledge on particular Situation+Needs. These weights have a default value, however the system allows them to be adjusted based on the opportunities the user wants to focus on. This provides a means of differentiation to the implementer of the system.

In one embodiment, the entities are aggregated up into two parameters: Importance level and Satisfaction Level using a calculation based on a quantification of underlying entities. System is flexible and accommodates weighting each entity as per the application and SME knowledge.

A heat map is a widely used framework to visualize such constructs. An embodiment with 3 (n=3) such levels (High, Medium and Low represented by 3 different colors such as Green, Yellow and Red) is included here. The system allows for the metric to be calculated in various ways and represented in different visualizations such as heat maps, clusters etc.

An example of the Intersection matrix with the Opportunity Level calculated is depicted in FIG. 14.

The heatmap is another section of the Visualization (UI) module to allow the system to display the opportunities to innovate to the user through the matrix.

The Opportunity Prediction/Prioritization Module also allows the user to then use this context of entities within a Need, Situation intersection to dive deeper into potential JTBDs. The user (SME) will be able to see the level of the intersection based on opportunities and ask more questions to gain insights.

The SME checks whether the weights of entities align with domain knowledge data, if the value is aligned then this module identifies areas of data with high innovation opportunity levels for further investigation and in case the value does not align then the Opportunity prioritization/prediction module provides an option to the user to manually override the weight of an entity (for example, pains).

The JTBD Creation Module, allows the user to use any of the main entities selected in the intersection matrix to create the Final JTBDs. In this embodiment, the user has selected the Needs+Situations intersection matrix. The user (SME) now has the Needs+Situation intersections with the highest opportunities to innovate (JTBDs) highlighted and aligned with their business goals and ideas. In our experience, motivation and desired outcome are expressed in needs (and, sometimes in situations or some combination thereof). SME grouping. In addition, if needed, one can extract "Desired Outcome" as another entity.

In one embodiment, the JTBD Creation Module uses the two main factors present in the Needs-Situation intersection, the Needs and the Situations to create the JTBD. In another embodiment, if the user wants the Motivation to be included in the Final JTBD statement, they can select the 3 factors of the system: Needs, Situation as well as the extracted "Desired Outcome/Motivation" entity to create the Final JTBDs.

Using the JTBD Augmentation Module, the present invention has a provision of adding the missing entities to complete the list and definition of JTBD, i.e. situation, needs and motivations. The present invention involves at least two methods to find out the missing entities, one method involves the steps of automated augmentation in which the JTBD Augmentation module extracts relevant data with a high semantic similarity and uses the extracted entities as a link to augment Needs and Situations with missing entities into complete JTBD statements. The method used can include the number of occurrences of variable pairs and combinations within each JTBD and the number of occurrences of entity pairs and combinations across multiple JTBDs. The Opportunity prioritization/prediction uses a function to factor in all the variables and uses the occurrence rates and weights to calculate a metric to help augment the missing entity based on variable pairs and combinations. Another method is a manual augmentation approach in which the user is allowed to manually assign the missing entity based on domain knowledge. The user gives one or multiple examples of the situations, motivations and outcomes and the system has to populate the list of the entities based on semantic similarity. This populated list is based on Fine-tuned LLM extraction using the examples to help extract similar entities in the data, and then using the entities to create the Final JTBDs for entities where some of the entities are missing.

In an embodiment of the present invention, any data extracted, modified, augmented, or processed is stored in a database (107).

The modules used in the present invention include processor, memory, non-volatile storage and an interface. The processor used herein refers to a general-purpose central processing unit (CPU), such as a microprocessor, or a special-purpose processor, such as a microcontroller or a General Processing Unit (GPU) or similar computing machines. The memory includes, by way of example but not limitation, random access memory (RAM), such as dynamic RAM (DRAM) and static RAM (SRAM). The non-volatile storage include, by way of example but not limitation, magnetic floppy or hard disk, a magnetic-optical disk, an optical disk, a read-only memory (ROM), such as a CD-ROM, EPROM, a magnetic or optical card, or another form of storage in the cloud for large amounts of data. Some of the data is often written by a direct memory access process into memory during execution of software on the computer system.

The interface for a computer system that encompasses various components, including but not limited to a modem or network interface, input/output (I/O) devices such as a keyboard, mouse, disk drives, printers, scanner, and display devices like CRT or LCD. It is to be noted that a modem or network interface can be regarded as a part of the computer system, and the interface can be coupled with other computer systems using various interfaces such as analog modem, ISDN modem, cable modem, token ring interface, satellite transmission interface (e.g., "direct PC"), or other suitable interfaces. It is also to be noted that the computer system includes by way of example but not limitation, laptops, desktops, smartphones and similar devices and software running on them such as browsers or other applications.

The present invention provides a system and method that leverages machine learning and artificial intelligence technologies to identify JTBD, evaluate and prioritize them, and thereby enhance customer satisfaction, revenue, and profitability. Further, the present invention enables understanding of the needs and goals of customers by utilizing sophisticated analytical techniques to assess customer behaviour and preferences, which allows businesses to better tailor their products and services to customer needs. By doing so, the present invention enables businesses to improve their competitive positioning and maintain a strong customer base, which ultimately drive long-term financial success.

In most preferred embodiment, the invention pertains to a system to identify and extract Jobs To Be Done (JTBD) comprising:

a) an input module (100) configured to receive an input data in a desired format, said input module further configured to prepare the input data for further processing;

b) a feature extraction module (101) configured to automatically perform an extraction operation on the input data processed in step a) to extract a plurality of entities related to the approach of JTBD;

c) a feature processing module (102) configured to identify patterns and relationships in the input data and grouping them for actionability;

d) an opportunity prioritization/prediction module (103) configured to assign a salience value to each of the plurality of entities; and e) a JTBD formulation module (105) configured to process the extracted entities, the groupings and the patterns relationships among the entities, identify data with multiple entities, and compile them into a list of JTBD;

wherein, the extraction operation on the input data processed in step b) is achieved by machine language (ML) and artificial intelligence (AI) techniques; the system allows clustering of extracted data based on prior knowledge from domain experts or subject matter experts (SMEs), as well as existing groups or frameworks and, wherein the system is configured to allow a user to modify the clustering by moving individual situations or groups of situations across clusters, combining clusters, splitting clusters, or a combination of thereof; and the system uses a situation vs. needs matrix and computes a desired metric.

The opportunity prioritization/prediction module (103) allows the user to use entities such as pain, barriers and hired or fired emotions to identify the opportunities of highest interest. The system computes the desired metric using other entities such as pains, hires to identify opportunity levels. The system allows the user to select three factors of the system namely needs, situation, and desired outcome or motivation entity to create the final JTBDs. The system allows the user to select said factors of the system in any sequence, any combination, and any permutation of entities to create the final JTBDs. The system aggregates the entities into two parameters namely importance level and satisfaction level using a calculation based on a quantification of the plurality of entities extracted. In this embodiment, the system further comprises a visualization/user interface (UI) module (104) configured to display the extracted entities, the groupings and the patterns relationships among the entities. The system allows for the metric to be calculated in a plurality of ways and represented in different visualizations such as heat maps, clusters. The system further comprises an additional JTBD augmentation module (106) configured to enhance the list of JTBD by predicting additional JTBD on the basis of data elements having a few of the extracted entities or prior knowledge or additional research.

In another most preferred embodiment, the invention pertains to a method to identify and extract Jobs To Be Done comprising the steps of:

a) receiving an input data in an input module (100) in a desired format, and processing the input data;

b) extracting a plurality of entities related to the approach of JTBD from the processed input data, in a feature extraction module (101) using machine language (ML) and artificial intelligence (AI) techniques;

c) identifying patterns and relationships in the extracted plurality of entities and grouping them in desired manner for actionability in a feature processing module (102);

d) assigning a salience value to each of the plurality of extracted entity in an opportunity prioritization/prediction module; and e) identifying data with multiple entities, and compiling them into a list of JTBD in a JTBD formulation module;

wherein, the extraction operation on the input data processed in step b) is achieved by machine language (ML) and artificial intelligence (AI) techniques; the method allows clustering of extracted data based on prior knowledge from domain experts or subject matter experts (SMEs), as well as existing groups or frameworks and, wherein the method allows a user to modify the clustering by moving individual situations or groups of situations across clusters, combining clusters, splitting clusters, or a combination of thereof; and the method uses a situation vs. needs matrix and computes a desired metric. The opportunity prioritization/prediction module (103) allows the user to use entities such as pain, barriers and hired or fired emotions to identify the opportunities of highest interest. The method include computing the metric using other entities such as pains, hires to identify opportunity levels. The method allows the user to select three factors namely needs, situation, and desired outcome or motivation entity to create the final JTBDs. The method allows the user to select said factors in any sequence, any combination, and any permutation of entities to create the final JTBDs. The method further includes the step of aggregating the entities into two parameters namely importance level and satisfaction level using a calculation based on a quantification of the plurality of entities extracted. The method further includes the step of displaying the plurality of entities, their groupings and their patterns/relationships, in a visualization/user interface (UI) module. The method allows the metric to be calculated in a plurality of ways and represented in different visualizations such as heat maps, clusters. The method further includes the step of enhancing the list of JTBD using JTBD augmentation module by predicting additional JTBD based on data elements having a few of the entities or prior knowledge or additional research.

Example 1: Extraction of Situations

Post—"It's only 11 AM but I've already demolished the bag of trail mix I brought for a work snack today. Why is it so hard to stop mindlessly munching at my desk?? I swear the vending machine is calling my name. Anyone have healthy desk snack recommendations that are actually satisfying?"

Extracted Situation—"Mindlessly Snacking at Work"

The next step is to process the extracted entity. This is the Feature Processing module. In one embodiment, it clusters the situations into groups based on semantic similarity using standard clustering techniques (K-Means, LDA, Topic Modeling, Hierarchical methods such as HDBScan etc.), LLM assisted clustering or some combination of these methods.

For example—"Mindlessly snacking at work" and "Craving a snack at work" extracted from two different posts are related and may be grouped together more broadly into "snacking at work".

These clusters are then given to an LLM (or using a Topic Modeling algorithm) to generate a cluster name representing all the context contained within the clustered posts. The LLM would generate a name, something along the lines of: "Snacking At Work"

The system allows guiding the clustering process based on prior knowledge from Domain Experts or Subject Matter Experts (SMEs), as well as existing groups or frameworks. For instance, an SME could group the Situations into Social, Emotional, and Functional categories. In such cases, the system enables the user to provide examples for each desired group, and then employs techniques like Few-Shot Learning to classify the situations accordingly.

Additionally, the system lets users modify the system-generated clustering by moving individual situations or groups of situations across clusters, combining clusters, splitting clusters, or a combination of these actions.

SME-guided clustering can take various forms. The system is configurable to use multiple algorithms for clustering—Two main categories are LLM-assisted and traditional methods. LLM-assisted include Few-shot and Zero-Shot techniques, as well as fine-tuned LLMs. The traditional algorithms include semantic similarity based clustering such as K-Means or density based such as HDBSCAN. The system supports configuring the desired clustering algorithm with appropriate metrics, such as distance from the cluster centroid or a maximum number of situations per cluster.

In one embodiment, the system solicits potential clusters from the SME, takes them as input, and then groups all the Situations around those clusters. This iterative system-based and SME-guided process continues until the SME is satisfied with the clustering or the system meets the prescribed criteria.

The Few-Shot technique involves providing a small number of examples for a group (e.g., Social), enabling the model to learn the group's semantics and classify the Situations accordingly.

Example 2: Guided Clustering

SME enters "At Home" and "At Work" as two potential clusters from prior subject knowledge. The system will now iterate through the list of Situations and classify them into the already available clusters (input from SME).

The system allows the same process to be followed for extracting all other entities (e.g. needs, wants, desires, need states, current situation or context, etc.). In particular, in one embodiment, the system will extract needs and (optionally) group them as described above for situations. Example Needs are:

Social Media Post—"It's only 11 AM but I've already demolished the bag of trail mix I brought for a work snack today. Why is it so hard to stop mindlessly munching at my desk?? I swear the vending machine is calling my name. Anyone have healthy desk snack recommendations that are actually satisfying?"

Extracted Need—"Need for Satisfying Healthy Desk Snacks"

Similarly, other extracted needs might be: "Need to feel more energized" and "Need for pre portioned snacks to prevent overeating."

Example 3: 2D Visualization of Data

Figures 12, 13:
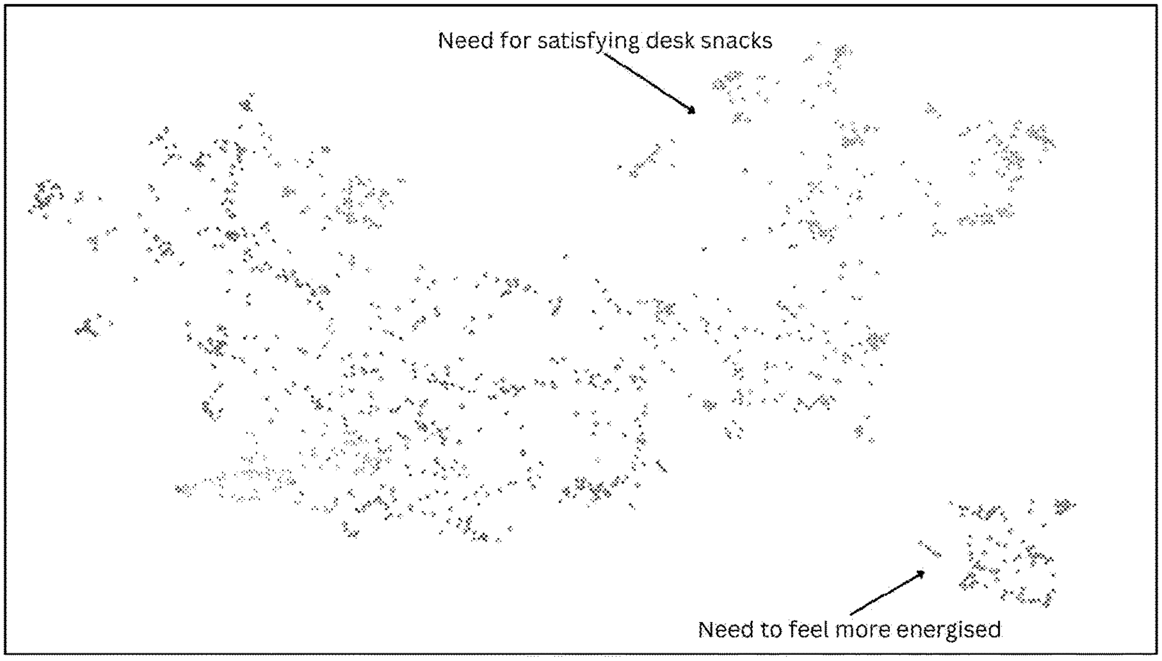
FIG. 12 shows a heat map diagram of clustered data generated by the system for identifying JTBD for achieving desired business outcomes in an exemplary embodiment.
FIG. 13 shows a sample data identified by the system for identifying JTBD for achieving desired business outcomes in an exemplary embodiment.

TBD: MOVE to later? The Visualization/User Interface (UI) Module, uses a 2D projection of the embedding vectors of the individual Needs and Situations extracted in the feature extraction module. These data points are then coloured based on their groupings, the user (SME) now has the opportunity to investigate the groupings and look at dense clusters and strong groupings and change the clustering mechanism in the feature processing module or change to guided clustering if the results are not satisfactory or do not align with business goals and outcomes. An example of the 2D visualization is depicted in FIG. 12. In one embodiment, The Intersection Matrix of Needs and Situations is also included in the Visualization Module, the matrix coloured by opportunity levels allows the user to dive deeper into Needs and Situation intersections.

Example 4: Prediction Matrix Using Need Based Entities

The Opportunity Prioritization/Prediction Module gives the user the ability to use other entities such as Pain, barriers and hired or fired emotions to identify the opportunities of highest interest. In one embodiment, system uses a Situation vs. Needs matrix and computes a metric using other entities such as pains, hires to identify opportunity levels. In one such embodiment, system creates a heatmap of 3 levels (High, Medium and Low represented by 3 different colors such as Green, Yellow and Red). If a Needs+Situation intersection is highlighted as Green, there is a very high probability of a strong JTBD opportunity to innovate.

System allows the use of multiple entities. Typically, these exist in the intersection between situations/contexts and need states. JTBD frameworks use entities such as what is being Hired or Fired, and the associated pains, barriers. Also, core jobs are typically Functional but related jobs are social and/or emotional. These entities are now viewed as variables to compute a metric. Using the variables, we propose a weighted equation which maps the numerical value of each of the variables into n levels based on opportunity to innovate.

Each variable has a normalized metric (1-10). This score encompasses the number of times a particular variable is present in the intersection, the confidence scores, and a weight. These weights are derived from historical data, domain expertise, and prior knowledge on particular Situation+Needs. These weights have a default value, however the system allows them to be adjusted based on the opportunities the user wants to focus on. This provides a means of differentiation to the implementer of the system. For example, 113 Industries Inc. has its own, proprietary weights based on historical data.

In one embodiment, the entities are aggregated up into two parameters: Importance level and Satisfaction Level using a calculation based on a quantification of underlying entities. System is flexible and accommodates weighting each entity as per the application and SME knowledge.

Example 5: Equations

Importance Level Metric(1-10)=Weight1*Pain Metric(1-10)+Weight2*Barrier Metric(1-10)+Weight3*Tensions Metric(1-10)/Normalization Factor Satisfaction Level Metric(1-10)=Weight1*Hired Solutions Metric(1-10)−Weight2*Fired Solutions Metric(1-10)/Normalization Factor Each entity has its own numerical value as a metric in the above equation. An example of the calculation is given below. In this example we are focusing on the Pain Metric (1-10). The Pain variables have been extracted from the Situations and the Needs.

Example of the Pain Variable Extracted:

Social Media Post: "I'm so over protein bars that taste like chalky cardboard! Every 'healthy' snack I try leaves me feeling unsatisfied and still craving something more indulgent. By 3 PM, I've usually caved and hit the office vending machine for chips or cookies. I need snacks that are actually tasty but don't make me feel sluggish or guilty after eating them. Why is it so hard to find that perfect balance of healthy and delicious?!"

Extracted Pain Point: "Lack of truly satisfying and enjoyable healthy snack options that don't lead to overeating unhealthy foods."

These pain variables are extracted across all the Situations and Needs in the matrix. In the Matrix now, we will calculate the Pain Metric for each individual intersection cell. They are then used to get the final Opportunity metrics as follows Pain Metric(1-10)=(Normalization factor)*(Needs Pain Ratio)

Needs Pain Ratio=(Number of Pain Variables in the current Needs-Situation Intersection)/(Number of Pain Variables across the current Need)

Needs Pain Ratio-Fixed Range of 0 to 1 (Ratio)

Pain Metric-Fixed Range of 0 to 10 (Lowest to Highest Pain Variable presence)

Example 6: Intersection Matrix with the Opportunity Level

TBD: Example: the emotional aspect for some Jobs may be much more significant and important than others.

A heat map is a widely used framework to visualize such constructs. An embodiment with 3 (n=3) such levels (High, Medium and Low represented by 3 different colors such as Green, Yellow and Red) is included here. The system allows for the metric to be calculated in various ways and represented in different visualizations such as heat maps, clusters etc.

An example of the Intersection matrix with the Opportunity Level calculated is depicted in FIG. 13 and FIG. 14.

As depicted in FIG. 12, the heatmap is another section of the Visualization (UI) module to allow the system to display the opportunities to innovate to the user through the matrix.

Example 7: Jobs-to-be-Done (Jtbds) for the Snacking Industry

Step 0—Domain Knowledge—Data Collection, what is the task at hand? Subject Matter Expert or Domain Expert.

The task is to identify potential Jobs-to-be-Done (JTBDs) for the snacking industry based on a dataset of social media posts. A Subject Matter Expert (SME) with deep understanding of the snacking domain will be involved in the process.

Step 1A—Extract the Situations from the social media posts.

The situations extracted from the social media posts include:

Snacking during commute

Snacking during a movie night with friends

Snacking while studying or working late

Snacking during a road trip

Snacking at a social event while trying to eat healthy

Step 1B—Cluster the situations into groups based on semantic similarity.

The situation groups identified are:

On-the-go Snacking (commuting, road trips)

Social Snacking (movie nights, parties)

Productivity Snacking (studying, working late)

Healthy Snacking (trying to eat well at social events)

Step 2A—Extract the Needs from the social media posts.

The needs extracted from the posts include:

Need for a convenient, mess-free snack to stay alert during long commute

Desire for an indulgent, satisfying snack to enjoy with friends during a movie night Craving for a quick energy boost to power through studying and work Wanting a variety of favorite snacks to enjoy during a road trip.

Seeking a healthy, nutritious snack option to fit in with healthy eating goals at a party Step 2B—Cluster the granular needs into higher-level need groups.

The need groups identified are:

Convenient, Mess-free

Quick Energy Boost

Indulgent, Satisfying

Variety of Favorites

Nutritious, Healthy

Step 2C—Create a Needs and Situations Intersection Matrix.

The Needs and Situations Intersection Matrix looks like this with opportunity levels as depicted in FIG. 13.

Step 3A—Assign Weights to Variables

Based on the SME's input and the team's understanding of the snacking domain, the weights assigned to the variables could be:

Pain Weight: 0.4

Barrier Weight: 0.3

Fired Weight: 0.7

Hired Weight: 0.5

These weights reflect the relative importance of each variable in the snacking context. For example, the emotional aspect of snacking during social occasions may be weighted more heavily than the functional need for a quick energy boost.

Step 3B—Analyze the Needs and Situations Intersection Matrix.

Using the weighted equation, we can identify the "high opportunity" intersections where the combination of pain points, barriers, and hired/fired solutions is the strongest.

Example Weighted Equation:

$$\text{Importance Level Metric}(1\text{-}10)=0.4*\text{Pain Metric}(1\text{-}10)+0.3*\text{Barrier Metric}(1\text{-}10)+\text{Weight3}*\text{Tensions Metric}(1\text{-}10)/\text{Normalization Factor}$$

$$\text{Satisfaction Level Metric}(1\text{-}10)=0.5*\text{Hired Solutions Metric}(1\text{-}10)-0.7*\text{Fired Solutions Metric}(1\text{-}10)/\text{Normalization Factor}$$

$$\text{Opportunity Level Metric}(1\text{-}100)=\text{Importance Level Metric}*(10-\text{Satisfaction Level Metric})$$

Applying this equation to the intersection matrix, we can see that the "Social" and "Indulgent, Satisfying" intersection has the highest opportunity level, with a score of 80 (out of a maximum of 100).

Step 3C—Allow User to Adjust Opportunity Levels

The user (SME) can choose to segment the opportunity levels into 3 categories:

High Opportunity (Score 50-100)

Medium Opportunity (Score 25-50)

Low Opportunity (Score 0-25)

Step 4—LLM-based Q&A

The SME can now dive deeper into the "Social" and "Indulgent, Satisfying" intersection, which has been identified as a high-opportunity area. They can use an LLM-based Q&A system to ask targeted questions and gather more insights, such as:

What specific emotions are people looking to satisfy when snacking during social occasions?

What are the pain points or barriers people experience when trying to find the right snack for social events?

Are there any hired or fired solutions that people currently use to address their emotional snacking needs in social situations?

How important are factors like convenience, indulgence, and sharability when it comes to snacking during social gatherings?

The insights gathered from this LLM Based Q&A process can help refine the understanding of the JTBD opportunities within this high-opportunity intersection.

Step 5—JTBD Creation Module

Based on the deep dive into the "Social" and "Indulgent, Satisfying" intersection, the SME can now formulate specific JTBDs. For example:

"When snacking during a social event, people want a satisfying and indulgent snack that is also convenient, shareable, and aligns with their desire to enjoy the moment with friends."

This JTBD statement captures the key elements identified through the analysis, including the situational context, the specific need, and the desired product attributes.

The JTBD Creation Module allows the SME to select the high-opportunity intersection and generate the final JTBD statement, incorporating the relevant needs, situations, and motivations.

The invention claimed is:

1. A system to identify and extract Jobs To Be Done (JTBD) comprising:

a) an input module (100) configured to receive an input data in a desired format including text, CSV, JSON, voice, or video, said input module further configured to prepare the input data for further processing;

b) a feature extraction module (101) configured to extract via a machine learning (ML) and artificial intelligence (AI) including LLM based techniques, a plurality of domain-specific entities associated with JTBD framework, wherein the plurality of domain-specific entities comprise at least needs including current situation (context), needs (including unmet needs), wants, desires, need states, compensating behaviours or work-arounds or hacks, solutions, (alternate) hires, deselects (products/services rejected very early on in the purchase cycle), activities, pains, barriers, tensions, motivation, desired outcome, social component, and emotional component (feelings, emotions);

c) a feature processing module (102) configured to identify patterns and relationships in the input data and grouping them for actionability and cluster the original data and the extracted data based on a prior knowledge from domain expert or subject matter experts (SMEs), or existing groups or frameworks and a user is allowed to modify the clustering by moving individual situations or groups of situations across clusters, combining clusters, splitting clusters, or a combination thereof and uses a situation vs. needs matrix and computes a desired metric by using other entities including pains, hires to identify opportunity levels and said desired metric is represented in heat maps and clusters;

d) an opportunity prioritization/prediction module (103) configured to assign a salience value to each of the plurality of entities and allows the user to use entities including pain, barrier, hire, or fire emotions to identify the opportunities of highest interest;

e) a JTBD formulation module (105) configured to generate one or more statements related to JTBD based on selected intersections of needs and situations having opportunity levels exceeding a predefined threshold; and f) an additional JTBD augmentation module (106) to predict additional statements by identifying missing entities based on partial entity sets, semantic similarity relationships, and occurrence-based metrics and augment the generated statements by incorporating the predicted additional statements.

2. The system as claimed in claim 1, wherein the system allows the user to select three factors of the system namely needs, situation, and desired outcome or motivation entity to create the final JTBDs.

3. The system as claimed in claim 2, wherein the system allows the user to select said factors of the system in any sequence, any combination, and any permutation of entities to create the final JTBDs.

4. The system as claimed in claim 1, wherein the system aggregates the entities into two parameters namely importance level and satisfaction level using a calculation based on a quantification of the plurality of entities extracted.

5. The system as claimed in claim 1, wherein the system further comprises a visualization/user interface (UI) module (104) configured to display the extracted entities, the groupings and the patterns relationships among the entities.

6. A method to identify and extract Jobs To Be Done comprising the steps of:

a) receiving an input data in an input module (100) in a desired format including text, CSV, JSON, voice, or video, and processing the input data;

b) extracting via a machine learning (ML) and artificial intelligence (AI) including LLM based techniques, a plurality of domain-specific entities associated with JTBD framework, wherein the plurality of domain-specific entities comprise at least needs including current situation (context), needs (including unmet needs), wants, desires, need states, compensating behaviours or workarounds or hacks, solutions, (alternate) hires, deselects (products/services rejected very early on in the purchase cycle), activities, pains, barriers, tensions, motivation, desired outcome, social component, and emotional component (feelings, emotions);

c) identifying patterns and relationships in the extracted plurality of entities and grouping them in desired manner for actionability in a feature processing module (102) and cluster the extracted data based on a prior knowledge from domain expert or subject matter experts (SMEs), as well as existing group or frameworks and a user is allowed to modify the clustering by moving individual situations or groups of situations across clusters, combining clusters, splitting clusters, or a combination of thereof and uses a situation vs. needs matrix and computes a desired metric by using other entities such as pains, hires to identify opportunity levels and said desired metric is represented in heat maps and clusters;

d) assigning a salience value to each of the plurality of extracted entity in an opportunity prioritization/prediction module that allows the user to use entities such as pain, barriers and hired or fired emotions to identify the opportunities of highest interest; and e) identifying data with multiple entities, and compiling them into a list of JTBD in a JTBD formulation module.

7. The method as claimed in claim 6, wherein the method include computing the metric using other entities such as pains, hires to identify opportunity levels.

8. The method as claimed in claim 6, wherein the method allows the user to select three factors namely needs, situation, and desired outcome or motivation entity to create the final JTBDs.

9. The method as claimed in claim 8, wherein the method allows the user to select said factors in any sequence, any combination, and any permutation of entities to create the final JTBDs.

10. The method as claimed in claim 6, wherein the method further includes the step of aggregating the entities into two parameters namely importance level and satisfaction level using a calculation based on a quantification of the plurality of entities extracted.

11. The method as claimed in claim 6, wherein the method further includes the step of displaying the plurality of entities, their groupings and their patterns/relationships, in a visualization/user interface (UI) module.

* * * * *